United States Patent [19]

Morr et al.

[11] Patent Number: 4,737,965
[45] Date of Patent: Apr. 12, 1988

[54] ADVANCED CHEMICAL LASER CAVITY FUEL INJECTION SYSTEM

[75] Inventors: Gary F. Morr, Thousand Oaks, Calif.; Stanley L. Pruett, Arab, Ala.

[73] Assignee: The United States of America as represented by the Secretary of the Army, Washington, D.C.

[21] Appl. No.: 259

[22] Filed: Jan. 2, 1987

[51] Int. Cl.$^4$ .............................................. H01S 3/095
[52] U.S. Cl. ......................................... 372/89; 372/90
[58] Field of Search .................................... 372/89, 90

[56] References Cited

U.S. PATENT DOCUMENTS

| | | | |
|---|---|---|---|
| 3,760,294 | 9/1973 | Roberts | 372/90 |
| 4,042,892 | 8/1977 | Fenneman | 372/90 |
| 4,097,820 | 6/1978 | Hull et al. | 372/90 |
| 4,237,429 | 12/1980 | Hook et al. | 331/94.5 G |
| 4,375,687 | 3/1983 | Hook et al. | 372/58 |
| 4,466,100 | 8/1984 | Broadwell | 372/89 |
| 4,553,243 | 11/1985 | Rosenwaks et al. | 372/85 |

Primary Examiner—Leon Scott, Jr.
Attorney, Agent, or Firm—Freddie M. Bush; James T. Deaton

[57] ABSTRACT

A chemical laser cavity fuel injection system is provided in which a converging-diverging nozzle for injecting an oxidizer has manifolds mounted at opposite sides and at the exit plane of the converging-diverging nozzle with fuel injection wedges connected to the manifolds and having ports therein for injecting fuel therethrough with each wedge terminating at one side of the nozzle before crossing the boundary layer region at this side of the converging-diverging nozzle to provide secondary wedges that are staggered to provide for more uniform mixing and therefore less degrading in the laser output power over prior art arrangements.

2 Claims, 2 Drawing Sheets

ADVANCED CHEMICAL LASER CAVITY FUEL INJECTION SYSTEM

DEDICATORY CLAUSE

The invention described herein may be manufactured, used, and licensed by or for the Government for governmental purposes without the payment to us of any royalties thereon.

BACKGROUND OF THE INVENTION

In the past, chemical lasers have used mixing of oxidizer in fuel streams to produce the lasing fluid. A recently developed method of mixing the streams is called the hypersonic wedge method. In this method, the oxidizer is produced in a combuster and is accelerated to a supersonic Mach number by a converging-diverging nozzle. Wedges are placed in the exit plane of the primary (oxidizer) nozzle and the fuel is injected into the primary steam from the bases of the wedges (fuel nozzles). This arrangement is illustrated in FIGS. 1 and 2. Existing nozzles have the wedges completely immersed in the primary stream and this is not always desirable due to the nozzle having large boundary layers.

Therefore, it is an object of this invention to provide an advanced chemical laser cavity fuel injection system in which the wedges for the fuel nozzles are not completely immersed in the primary stream of the primary nozzle.

Another object of this invention is to provide an advanced chemical laser cavity fuel injection system that has improved performance by the specific arrangement of the wedges used in the system.

Another object of this invention is to provide an arrangement which reduces power loss.

Still another object of this invention is to provide cantilever wedge arrangement of the wedges in which the wedges terminate on one side before the boundary layer region of the primary nozzle on this side is penetrated.

Yet another object of this invention is to provide an arrangement in which the secondary nozzle wedges are less expensive to fabricate and easier to maintain.

Still another object of this invention is to provide secondary wedges that are shorter in length and therefore less costly to build.

Other objects and advantages of this invention will be obvious to those skilled in this art.

SUMMARY OF THE INVENTION

In accordance with this invention, an advanced chemical laser cavity fuel injection system is provided in which an oxidizer is accelerated to a supersonic Mach number through a converging-diverging nozzle with wedges placed at the exit plane of the converging-diverging nozzle for injecting fuel into the primary oxidizer stream from the bases of the fuel wedges. The fuel wedges are staggered in a manner such that each wedge terminates before reaching the opposite side of the primary nozzle exit plane so as to cross the boundary layer on only one side of the converging-diverging nozzle. The fuel nozzles are also single end fed from a supply manifold. This arrangement provides for a more efficient arrangement in providing greater output power capability from the laser.

DESCRIPTION OF THE PREFERRED EMBODIMENT

Figure 1:
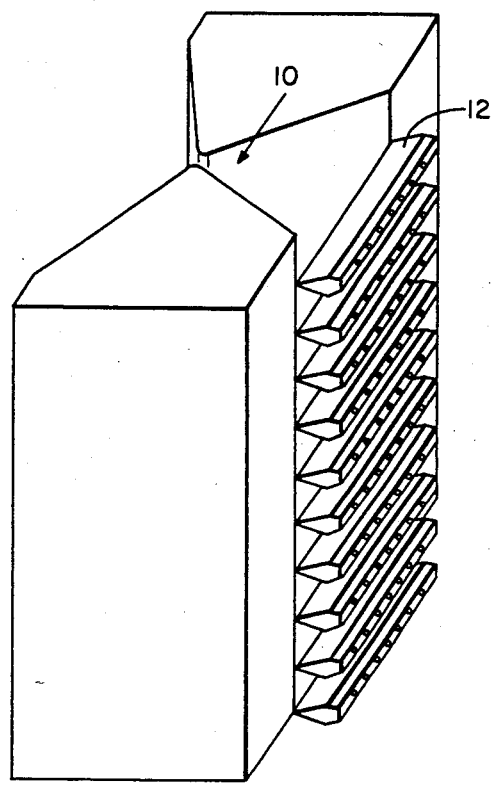
FIG. 1 is a perspective view of a prior art device.
Figure 2:
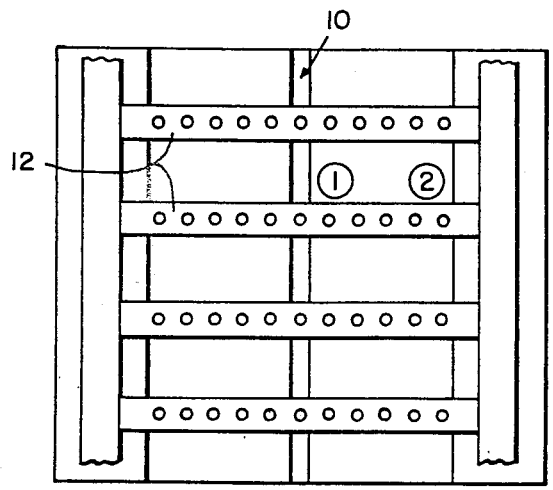
FIG. 2 is an end view illustrating a prior art device with a primary nozzle and secondary injector nozzles.
Figure 3:
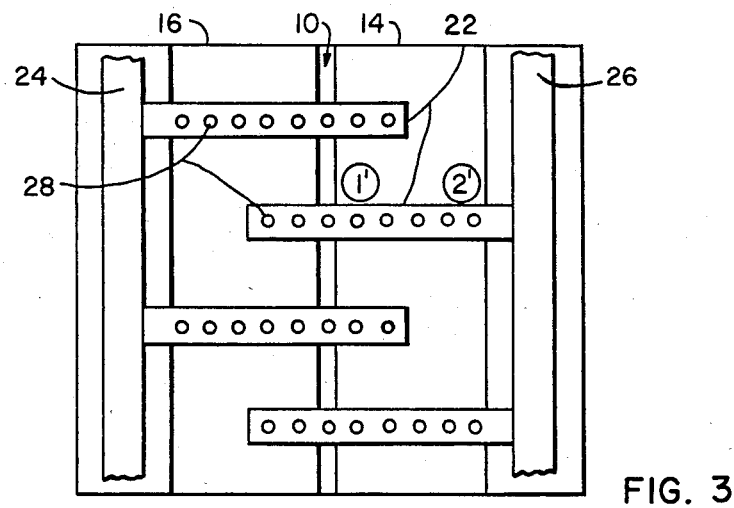
FIG. 3 is an end view illustrating an arrangement in accordance with this invention.

Referring now to the drawings, the prior art illustrated in FIGS. 1 and 2 includes an arrangement for mixing of oxidizer and fuel streams to produce the lasing fluid. This developed method of mixing the streams of oxidizer and fuel is called the hypersonic wedge concept. In this arrangement, the oxidizer is produced in a combuster (not illustrated) and is accelerated to a supersonic Mach number by converging-diverging nozzle 10. Wedges 12 are placed in the exit plane of the primary nozzle 10 and fuel is injected into the primary stream emerging from the bases of wedges 12. Existing nozzles have wedges 12 completely immersed in or extending completely across the exit plane of converging-diverging nozzle 10 as illustrated in FIGS. 1 and 2. In applicants' arrangement as illustrated in FIG. 3, secondary wedges 22 are connected to manifolds 24 and 26 with the secondary wedges staggered in a manner such that each wedge 22 terminates before reaching the opposite side of primary nozzle 10 exit plane. As will be appreciated, fuel nozzles 22 differ from those previously used in that nozzles 22 are each single end fed from their respective manifold 24 or 26 for supplying fuel to outlets 28 for mixing of fuel with the oxidizer from converging-diverging nozzle 10. This specific arrangement of manifolds 24 and 26 as well as the staggering of fuel nozzles 22 with the fuel nozzles terminating before reaching the opposite side of the primary nozzle exit plane greatly increases the efficiency of a hypersonic wedge nozzle arrangement.

Figure 4:
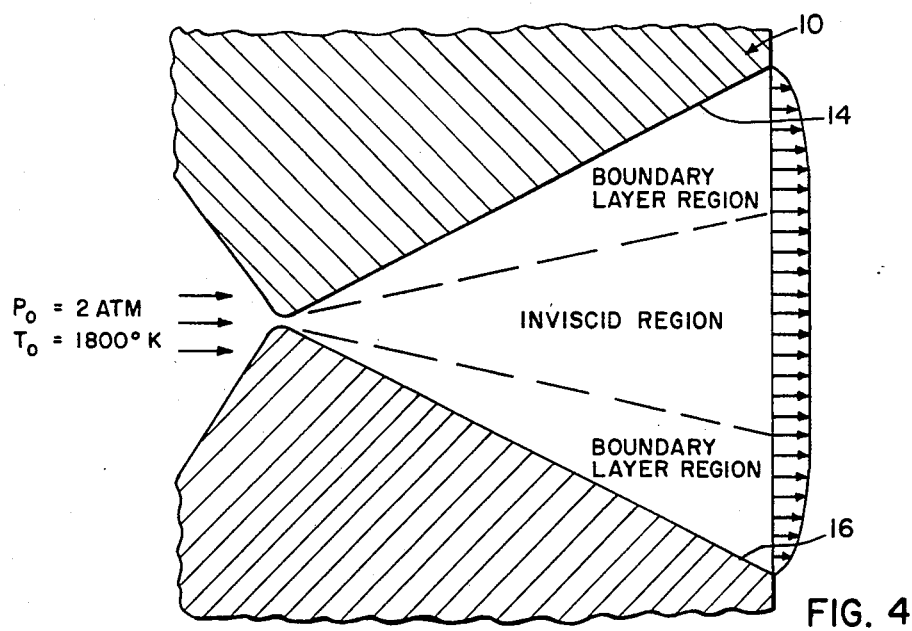
FIG. 4 is a sectional view through a primary nozzle illustrating the layers of flow through the primary nozzle.
Figure 5:
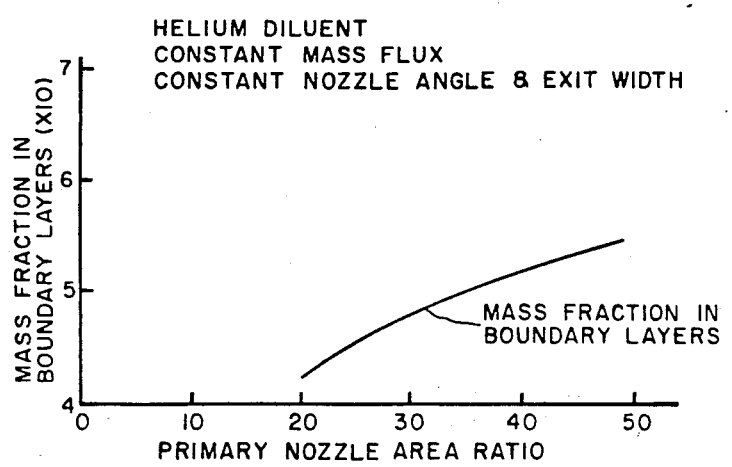
FIG. 5 is a graph illustrating the mass fraction in the boundary layers of the primary nozzle.

To further explain applicants' specific advantages using this structure, applicants' chemical laser nozzle arrangement is specifically adapted to be used for both hydrogen fluoride and deuterium fluoride lasers. The Reynolds number in primary nozzle 10 is relatively low which results in a stream with large viscous effects or a large boundary layer at each side of the diverging nozzle and adjacent opposite walls 14 and 16 as illustrated in FIG. 4. FIG. 4 illustrates a typical primary nozzle 10 for deuterium fluoride lasing with $N_2$ diluent. This boundary layer region is relatively large, and FIG. 5 shows the fraction of the mass flow that is in the boundary layer for a hydrogen fluoride laser with helium diluent. As dipicted in FIG. 5, 40 to 50% of the flow is in the boundary layer regions. Computations also indicate similar results for deuterium fluoride lasing. Since the velocity is lower in the boundary layer regions, relatively strong shocks are generated by the wedges as the flow passes through them. These strong shocks have the adverse effect of reducing the Mach number for this region of flow and increasing the static pressure at the wedge exits. Both of these factors degrade the laser output power. This has been verified experimentally by small signal gain measurements that show certain regions of the boundary layer to have absorbing rather than amplifying characteristics. Applicants' specific arrangement as illustrated in FIG. 3 does not completely eliminate this region, but reduces the power loss considerably. This reduction in the power loss is appreciated by using the cantilever wedge arrangement in which each wedge is terminated on one side before the boundary layer region is penetrated at this one side. That is, the secondary wedges only cross one of the boundary layer regions and terminate at the opposite boundary layer region. Therefore, the boundary layer flow passing through the spaces made available by the cantilever arrangement is degraded less by the presence of wedges 22 and emerges from the exit ends of wedges 22 at approximately the primary nozzle exit Mach number and flow conditions. A specific comparison of the pressures and Mach numbers (for a deuterium fluoride laser with $N_2$ diluent) is shown below and is referenced to the circled positions 1 and 2 of FIG. 2 and circled positions 1' and 2' of FIG. 3.

|  | FOR FIG. 2 | |
| --- | --- | --- |
|  | Position 1 | Position 2 |
| Pressure | 4.75 TORR | 11.88 TORR |
| Mach Number | 4.51 | 3.62 |

|  | FOR FIG. 3 | |
| --- | --- | --- |
|  | Position 1' | Position 2' |
| Pressure | 4.75 TORR | 5.71 TORR |
| Mach Number | 4.51 | 4.02 |

In operation, with oxidizer presented to converging-diverging nozzle 10, the oxidizer will be accelerated through converging-diverging nozzle 10 and fuel will be provided from manifolds 24 and 26 to exit ports 28 of wedges 22. With applicants' staggered arrangement of wedges 22 and the termination of the wedges before they cross the opposite side boundary layer region, the oxidizer and fuel produce a more efficient lasing medium of the oxidizer and fuel due to applicants' specific arrangement.

As will be appreciated, applicants' wedges 22 have the same streamlined cross sectional shape as that of the prior art, but applicants' wedges 22 are less expensive to fabricate and easier to maintain. That is, the cost of making secondary wedges 22 is proportional to the length of the wedges. Since in applicants' arrangement, wedges 22 are shorter than those used in the prior art arrangement, the manufacturing expense is correspondingly lower. Ease of installation and changing of the secondary wedges in applicants' arrangement is easier due to applicants using two separate and distinct manifolds 24 and 26 with separate sets of wedges 22 attached to each of manifolds 24 and 26. With this arrangement as provided by applicants, if one wedge 22 develops a leak, then only the wedge set and manifold with the problem can be removed for repair and the other manifold with its wedges thereon remain secured in position. A similar problem of this type in the prior art arrangement of FIG. 2 necessitates complete removal of all wedges 12 and the manifolds at opposite ends thereof.

We claim:

1. In a chemical laser cavity fuel injection system, a converging-diverging nozzle for accelerating an oxidizer at a supersonic Mach number, said converging-diverging nozzle having opposite diverging walls that terminate at an exit plane of said converging-diverging nozzle, a boundary layer region adjacent each diverging wall, a pair of manifolds mounted relative to the converging-diverging nozzle structure and at the exit plane of said converging-diverging nozzle where said diverging walls terminate, each of said pair of manifolds having a plurality of fuel injection wedges connected thereto with fuel ports, therein for injecting fuel therethrough, said wedges of each of said pair of said manifolds projecting in opposite directions and across a portion of said converging-diverging nozzle exit plane from one diverging wall toward the other and each of said wedges terminating at one of the boundary layer regions to define a multiplicity of wedges that are mounted on said pair of manifolds in a staggered arrangement so that each wedge is fed fuel from one end and terminated at another end before projecting across said one of said boundary layer regions to cause pressures and Mach numbers from flow through said nozzle and at spaced positions across said nozzle to be more uniform due to said wedges being staggered and terminating at said one of the boundary layer regions to thereby reduce pressure losses through said nozzle and cause a more efficiect lasing medium to be produced.

2. In a chemical laser cavity fuel injection system as set forth in claim 1, wherein said wedges are streamlined in configuration with the fuel ports at a trailing end of each wedge.

* * * * *